(12) United States Patent
Gumm et al.

(10) Patent No.: US 6,384,589 B1
(45) Date of Patent: May 7, 2002

(54) REFERENCE FREQUENCY SPUR CANCELLATION IN SYNTHESIZED MEASUREMENT RECEIVERS

(75) Inventors: Linley F. Gumm, Beaverton; Thomas L. Kuntz, Portland; Xiaofen Chen, West Linn, all of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/826,495

(22) Filed: Apr. 4, 2001

(51) Int. Cl.[7] .............................................. G01R 13/20
(52) U.S. Cl. .................................................... 324/76.26
(58) Field of Search ........................... 324/76.11, 76.26, 324/76.41, 76.52, 95, 76.19; 455/119, 258, 334, 296, 302, 310; 331/1 R, 16, 25; 375/226, 227, 349

(56) References Cited

U.S. PATENT DOCUMENTS 4,918,382 A * 4/1990 Bales et al. ............... 324/76.19
5,493,210 A * 2/1996 Orndorff et al. ............... 324/95

* cited by examiner

Primary Examiner—Safet Metjahic
Assistant Examiner—E. P. LeRoux
(74) Attorney, Agent, or Firm—Francis I. Gray

(57) ABSTRACT

Reference frequency spur cancellation in a synthesized measurement receiver is achieved by determining for any given frequency to which the receiver is tuned a list of integer multipliers of the reference frequency that produce spurious signals in the receiver's passband. For those values the amplitude and phase for each spurious signal is determined in the digital domain and subtracted from the digital signal from the receiver. The reference frequency is then offset slightly and the measurement repeated. The maximum values between each measurement are combined to produce a measurement for the input signal without spurious signals.

3 Claims, 1 Drawing Sheet

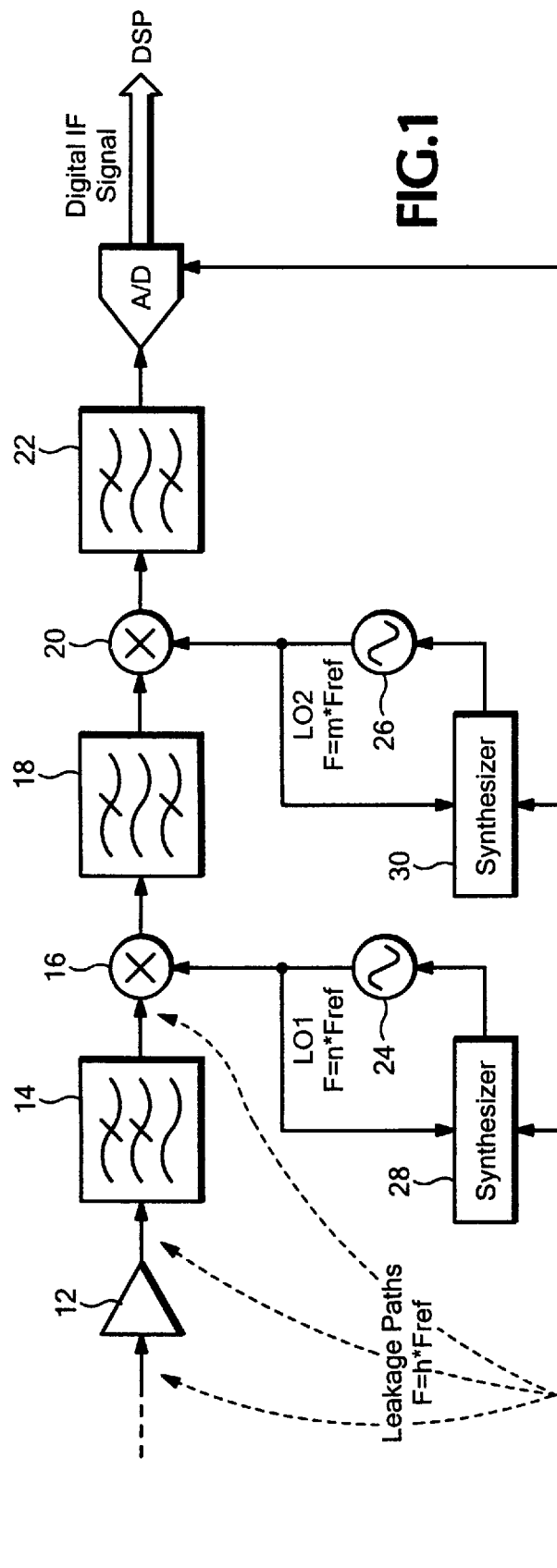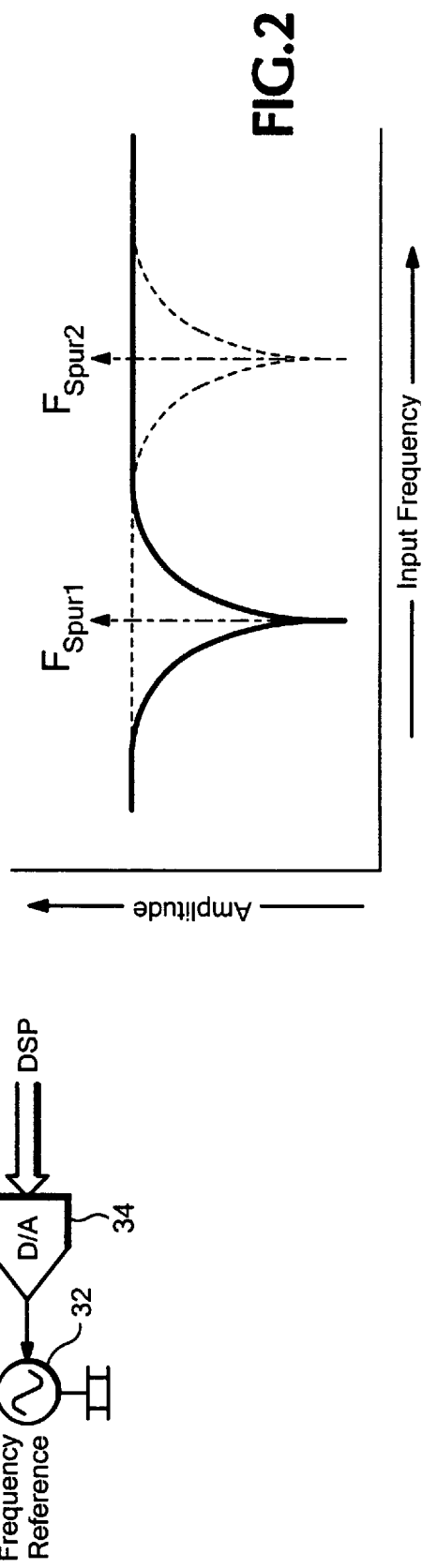

REFERENCE FREQUENCY SPUR CANCELLATION IN SYNTHESIZED MEASUREMENT RECEIVERS

BACKGROUND OF THE INVENTION

The present invention relates to radio frequency receivers, and more particularly to a method of reference frequency spur cancellation in synthesized measurement receivers.

Frequency spurs, i.e., frequency spectra unrelated to a received signal to be measured caused by sources within a radio frequency receiver, such as the reference frequency in a synthesized measurement receiver, are a constant problem to RF designers. Combining the effects of the reference's high amplitude with its tendency to create many harmonics means that this signal may leak into the receiver's front end, as shown in FIG. 1. This creates spurs when the receiver is tuned to any frequency near one of those harmonics. Up until now the hardware designer had to perfect the hardware's shielding to the point that the spur is suppressed below the receiver's noise floor.

The frequency of a spur caused by the reference frequency $F_{ref}$ at a first intermediate frequency stage in a synthesized measurement receiver is:

$$F_{IF1} = nF_{ref} - hF_{ref} = F_{ref}(n-h)$$

where $nF_{ref} = LO1$ and $hF_{ref} = $ spur. Since the second local oscillator is below the first IF frequency, at the second IF the spur frequency is:

$$F_{IF2} = F_{IF1} - mF_{ref} = F_{ref}(n-h-m)$$

where $mF_{ref} = LO2$. h is an integer indicating the harmonic order of $F_{ref}$, while m and n may be either integer or rational, i.e., the ratio of two integer numbers. In RF systems it is common for the signal input to an A/D converter to be in the frequency range between the Nyquist frequency, i.e., one-half the sample clock, and the frequency of the sampling clock itself. Therefore the frequency of the signal at the digital signal output is:

$$F_{DIF} = F_{ref} - F_{IF2} = F_{ref}(1-n+m+h) Hz$$

In terms of digital domain frequency the frequency of the digital signal is normalized by the reference frequency:

$$F_{digital} = F_{DIF}/F_{ref} = (1-n+m+h) \text{cycles/sample}$$

What is desired is a method of canceling the spur in a frequency spectrum of a signal caused by a reference frequency used in a synthesized measurement radio frequency receiver.

BRIEF SUMMARY OF THE INVENTION

Accordingly the present invention provides a method of reference frequency spur cancellation in a synthesized radio frequency receiver by determining values of an integer multiplier that cause the reference frequency to leak into the input signal path for known frequencies of the local oscillators derived from the reference frequency. For those integer values that cause such leakage, the amplitude and phase of the spurs are estimated in the digital domain and subtracted from the input signal. This removes signals from a narrow range of frequencies near spurs. To maintain the input signal at frequencies near spurs, the process is repeated with the reference frequency offset slightly, and the maximum values from the two measurement results provide the measurement of the input signal.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a block diagram view of a portion of a synthesized measurement radio frequency receiver.

FIG. 2 is a graphic view of a frequency spectrum illustrating spur cancellation according to the present invention.

DETAILED DESCRIPTION OF THE INVENTION

In a fully synthesized radio frequency receiver, as shown in FIG. 1, an input signal is pre-processed by an amplifier 12 and lowpass filtered by an input filter 14. The pre-processed input signal is then input to a first mixer 16, filtered by a first IF filter 18, input to a second mixer 20 and filtered by a second IF filter 22 before being digitized by an A/D converter 24 for input to a DSP for digital signal processing. The frequencies of first and second local oscillators (LO1 and LO2) 24, 26 are generated from respective synthesizers 28, 30 which in turn are clocked from a reference frequency source 32 controlled by the output of D/A converter 34 having a control signal input from the DSP. The frequency of spurs caused by leakage of the reference frequency signal from the source 32 into the front end amplifier 12, lowpass filter 14 and first mixer 16 are known exactly, i.e., the source making the spur is the same one providing the reference frequency to tune the local oscillators 24, 26. After the front end processed input signal including any spurs is in the digital domain it is a straight forward process to closely estimate the spurs' amplitude and phase since the spurs are simple, sine wave tones as the reference frequency is not modulated. The spurs then may be simply subtracted from the digitized signal, removing them from the measurement of the input signal. In principle this is true in any synthesized receiver, even those using analog final signal processing. In an analog receiver a negative version of the spur's IF signal is added to the signal instead of subtracting as in the digital receiver. But in a practical realization a digital signal processor-based final signal processing is required to obtain sufficient accuracy to make the process work well.

The harmonic of the reference frequency itself is the spur signal, and all subsequent frequency conversions in the first and second mixers 16, 20 are dependent on the reference frequency. Referring to the equations shown above, when the receiver is tuned to a given frequency, n and m are well known. In addition the bandwidths of the IF filters 18, 22 are known so that it is easy to determine a short list of the values of n and m that cause the receiver to tune to a reference harmonic h. As an example referring to FIG. 1 a reference frequency 32 of 60 MHz directly clocks the A/D converter as well as provides the reference frequency for the synthesizers 28, 30. The second LO's synthesizer 30 sets the second LO 26 to exactly 60 times the reference frequency, or 3600 MHz. The DSP process plus the second IF filter 22 limit the range of signals that affect the receiver's output to 45 MHz+/−5 MHz. If a spur caused by the reference frequency falls in this range, it is a problem. The 3600 MHz second LO translates this frequency range to 3645 MHz+/−5 MHz in the first IF filter 18. Considering the first harmonic of the reference at 60 MHz, and first LO frequency that translates this frequency to 3645 MHz+/−5 MHz causes the reference spur problem. The first synthesizer 28 steps the first LO 24 in 2 MHz steps or $F_{LO1}=(n/30)F_{ref}$ MHz. This is reduced to the values in the table below:

| n | $F_{LO1}$ | $F_{IF1}$ | $F_{IF2}$ | $F_{DIF}$ | $F_{Digital}$ |
|---|---|---|---|---|---|
| 1851 | 3702 | 3642 | 42 | 18 | 0.3000 |
| 1852 | 3704 | 3644 | 44 | 16 | 0.2667 |
| 1853 | 3706 | 3646 | 46 | 14 | 0.2333 |
| 1854 | 3706 | 3648 | 48 | 12 | 0.2000 |

Thus the frequency of the digital representation of the spurious signal(s) caused by the reference frequency is perfectly known based on the frequency to which the receiver is tuned. The phase and amplitude of any given spur are not known—the amplitude because of the variability of the signal amplitude and leakage path loss as a function of frequency; and the phase primarily because of the uncertainty of the state of the various synthesizers 28, 30. The amplitude and the phase of the spur in the digital domain may be easily estimated by a number of techniques, such as by using the following equations:

$$SpurPhasorEstimate = A + jB = (1/N)*SUM_{n=0 \to N-1}[x(n)*\exp(-j*2pi*F_{spur}*n/F_s)]$$

$$A = (1/N)*SUM_{n=0 \to N-1}[x(n)*\cos(2pi*F_{spur}*n/F_s)]$$

$$B = (1/N)*SUM_{n=0 \to N-1}[x(n)*-\sin(2pi*F_{spur}*n/F_s)]$$

where $x(n) = x_{re}(n) + j*x_{im}(n)$. This amounts to translating the complex spur component to 0 Hz and averaging the samples, i.e., lowpass filtering, to get the mean phasor value. Once known, the spurious signal may be numerically subtracted from the digitized signal.

In principle the bandwidth of this process may be made essentially zero. Thus the probability of finding and eliminating a legitimate, i.e., non-spurious, input signal at exactly the reference frequency is very small. In practice the measurement record lengths used are limited. Therefore if there is a legitimate signal at a similar or higher amplitude than the spurious signal and near it in frequency, it may be partially or fully subtracted from the input signal by this process, as shown for Spur1 in FIG. 2. To avoid this problem the reference frequency is made tunable over a narrow frequency range. A first measurement is made with the reference frequency set to its nominal frequency value, resulting in the first spur: $h*F_{ref}=F_{spur1}$. The first spur is estimated and subtracted from the signal leaving a measurement uncertainty near its frequency, as shown by the solid curve. The reference frequency is tuned through a small frequency range so that the input signal is shifted relative to the spur by $h*(F_{ref} \pm \Delta f) = F_{spur2}$. This frequency distance is known from prior calibration of the reference frequency source's tuning characteristic. Based on this knowledge the frequency scale of the second measurement is processed to also remove the spur from this measurement and then offset to place the data correct on the frequency axis as shown by the dotted curve.

For final display at each point on the frequency axis the maximum amplitude from either the solid or dotted curve is used in a final data array. The result is a measurement of the input signal without the reference frequency spurs. This provides a simple approach with limited complexity.

Thus the present invention provides reference spur cancellation in a synthesized measurement receiver by determining, with known multipliers for the reference frequency to produce local oscillator frequencies, a list of integers that cause the reference frequency to leak into the input signal path as spurious signals, by estimating the amplitude and phase of the spurs in the digital domain to subtract them from the input signal, by repeating the measurement with the frequency of the reference frequency offset slightly, and by providing an output that is the maximum amplitude between the two measurements as the measurement of the input signal without spurs.

What is claimed is:

1. A method of reference frequency spur cancellation in a synthesized measurement receiver comprising the steps of:

for a given frequency to which the receiver is tuned determining a list of values of an integer multiplier for the reference frequency that cause a spurious signal in an input signal path;

estimating in the digital domain amplitude and phase for the spurious signal; and subtracting the amplitude and phase of the spurious signal from the input signal to provide a measurement of the input signal without the spurious signal.

2. The method as recited in claim 1 further comprising the steps of:

repeating the determining, estimating and subtracting steps with the frequency of the reference frequency offset slightly to provide a second measurement of the input signal without the spurious signal; and combining the measurements of the input signal from the two iterations to produce the measurement of the input signal without the spurious signals.

3. The method as recited in claim 2 wherein the combining step comprises the step of taking the maximum between the two measurements to produce the measurement of the input signal.

* * * * *